US011936104B2

(12) United States Patent
Urtz et al.

(10) Patent No.: US 11,936,104 B2
(45) Date of Patent: Mar. 19, 2024

(54) LUNEBURG LENS FORMED OF ASSEMBLED MOLDED COMPONENTS

(71) Applicant: JOHN MEZZALINGUA ASSOCIATES, LLC, Liverpool, NY (US)

(72) Inventors: Thomas Urtz, Liverpool, NY (US); Jeremy Benn, Liverpool, NY (US); Evan Wayton, Tully, NY (US)

(73) Assignee: John Mezzalingua Associates, LLC, Liverpool, NY (US)

( * ) Notice: Subject to any disclaimer, the term of this patent is extended or adjusted under 35 U.S.C. 154(b) by 170 days.

(21) Appl. No.: 17/602,050

(22) PCT Filed: Sep. 20, 2019

(86) PCT No.: PCT/US2019/052117
§ 371 (c)(1),
(2) Date: Oct. 7, 2021

(87) PCT Pub. No.: WO2020/209889
PCT Pub. Date: Oct. 15, 2020

(65) Prior Publication Data

US 2022/0181785 A1 Jun. 9, 2022

Related U.S. Application Data

(60) Provisional application No. 62/832,505, filed on Apr. 11, 2019.

(51) Int. Cl.

| | |
|---|---|
| ***H01Q 15/08*** | (2006.01) |
| ***G02B 3/00*** | (2006.01) |
| ***H01Q 15/10*** | (2006.01) |

(52) U.S. Cl.
CPC ............. *H01Q 15/08* (2013.01); *H01Q 15/10* (2013.01)

(58) Field of Classification Search
CPC ........ H01Q 15/02; H01Q 15/08; H01Q 15/10; H01Q 19/06; G02B 3/00; G02B 3/06; G02B 9/00
See application file for complete search history.

(56) References Cited

U.S. PATENT DOCUMENTS

| | | | |
|---|---|---|---|
| 2,835,891 | A | 5/1958 | Peeler et al. |
| 2,943,358 | A | 7/1960 | Hutchins et al. |

(Continued)

FOREIGN PATENT DOCUMENTS

| | | | |
|---|---|---|---|
| CN | 104638377 A | 5/2015 | |
| FR | 1391029 A | 3/1965 | |
| WO | 2019-003939 | 1/2019 | |

OTHER PUBLICATIONS

International Search Report and Written Opinion dated Jan. 10, 2020, from International Application No. PCT/US2019/052117, 10 pages.

(Continued)

*Primary Examiner* — Tho G Phan
(74) *Attorney, Agent, or Firm* — Meunier Carlin & Curfman LLC

(57) ABSTRACT

Disclosed is a Luneberg lens that is formed of a plurality of wedge sections that can be easily assembled into a sphere. The wedge sections can be formed of an injection molded plastic, which can dramatically reduce the cost of manufacturing the lens. Different configurations of wedge sections are disclosed.

15 Claims, 7 Drawing Sheets

(56) References Cited

U.S. PATENT DOCUMENTS

| | | | | | |
|---|---|---|---|---|---|
| 3,133,285 | A | | 5/1964 | Jordan et al. | |
| 3,274,668 | A | * | 9/1966 | Horst | H01Q 15/08<br>425/808 |
| 3,914,769 | A | * | 10/1975 | Andrews | H01Q 15/08<br>343/911 L |
| 4,848,882 | A | * | 7/1989 | Suzuki | G02B 6/425<br>385/33 |
| 5,541,774 | A | * | 7/1996 | Blankenbecler | G02B 3/0068<br>359/653 |
| 5,677,796 | A | * | 10/1997 | Zimmerman | H01Q 15/08<br>359/720 |
| 6,034,825 | A | * | 3/2000 | Konishi | G02B 3/0087<br>359/654 |
| 6,721,103 | B1 | * | 4/2004 | Strickland | H01Q 15/08<br>343/909 |
| 10,931,025 | B2 | * | 2/2021 | Yoshida | H01Q 1/1264 |
| 2004/0061948 | A1 | | 4/2004 | Strickland | |
| 2006/0165971 | A1 | | 7/2006 | Kuroda et al. | |
| 2015/0070230 | A1 | | 3/2015 | Bradley et al. | |

OTHER PUBLICATIONS

Extended European Search Report, dated Nov. 30, 2022, received in connection with corresponding EP Patent Application No. 19924316.3, 17 pages.

Sayanskiy, A., et al., "Focusing Performance of Luneburg Lenses Based on a Broadband Artificial Dielectric Metamaterial," 11th International Congress on Engineered Materials Platforms for Novel Wave Phenomena—Metamaterials, 2017, pp. 304-306.

Office Action dated Apr. 12, 2023 received in connection with corresponding Chinese Patent Application No. 201980097171.1 (with English-language translation) (16 pages).

* cited by examiner

LUNEBURG LENS FORMED OF ASSEMBLED MOLDED COMPONENTS

BACKGROUND OF THE INVENTION

Field of the Invention

The present invention relates to wireless communications, and more particularly, to gradient-index lenses used to enhance antenna beam quality.

Background

A Luneburg lens is a spherically-symmetric refractive index gradient lens. Its shape and index gradient make it useful in applications from optics to radio propagation. A typical Luneburg lens has a first refractive index $n_c$ at its center. The refractive index diminishes radially to a second refractive index $n_s$ at the surface. The refractive index gradient may ideally follow a continuous function of radius, although variations are possible having a plurality of stepped refractive indices in the form of concentric spheres, each with a different refractive index. Having stepped refractive indices may lead to less than ideal performance, but it makes the Luneburg lens easier to manufacture. Accordingly, the finer the gradient in refractive index, the better the performance of the lens.

Conventional approaches to manufacturing a Luneburg lens with a fine index gradient involves 3D printing, in which a 3-dimensional grid of struts in the x/y/z directions may serve as a lattice or scaffold. Fine structures (e.g., cubes) are formed by the 3D printer at the intersections of the struts within the scaffold. The dimensions of the cubes may be designed such that their volume starts at an initial value at the center, and the volume of the cubes at each scaffold joint decreases as a function of the given scaffold joint's distance from the center.

A problem with this approach, as well as other conventional manufacturing approaches, is that they are expensive, both in terms of equipment needed and the time required to make one Luneburg lens.

Accordingly, what is needed is a Luneburg lens design that offers a fine refractive index gradient and is easy and inexpensive to manufacture.

SUMMARY

Accordingly, the present invention is directed to a Luneberg lens formed of assembled molded components that obviates one or more of the problems due to limitations and disadvantages of the related art.

An aspect of the present invention involves a refractive index gradient lens having a plurality of wedge sections, each wedge section encompassing a longitudinal slice of the refractive index gradient lens. Each wedge section comprises a plate having a polar edge and a plurality of refractive index gradient forming features disposed on the plate.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate a Luneberg lens formed of assembled molded components. Together with the description, the figures further serve to explain the principles of the Luneberg lens formed of assembled molded components described herein and thereby enable a person skilled in the pertinent art to make and use the a Luneberg lens formed of assembled molded components.

DESCRIPTION OF EXEMPLARY EMBODIMENTS

Reference will now be made in detail to embodiments of Luneberg lens formed of assembled molded components according to principles described herein with reference to the accompanying figures. The same reference numbers in different drawings may identify the same or similar elements.

Figure 1:
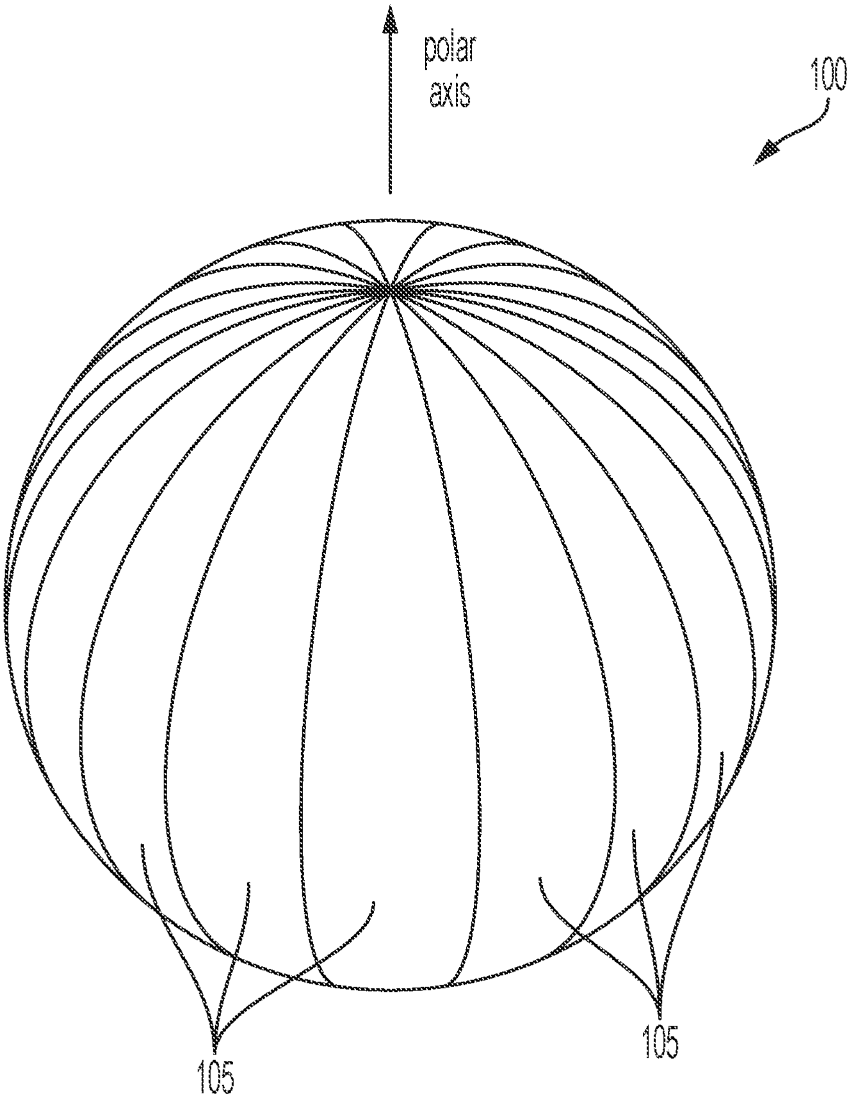
FIG. 1 illustrates an exemplary assembled refractive index gradient lens according to the disclosure.

FIG. 1 illustrates an exemplary refractive index gradient lens, such as a Luneburg lens 100 according to the disclosure. Refractive index gradient lens 100 is formed of a plurality of wedge sections 105, which are joined together to form a sphere. As illustrated, each wedge section 105 is shaped like a wedge, although other shapes are possible and within the scope of the disclosure. Each wedge section 105 may define or encompass a given longitudinal slice or section of the sphere of Luneberg lens 100. Each wedge section 105 may be formed of an injection molded plastic, such as ABS, ASA, or Nylon. The plastic material may be of a variety that acts as a dielectric, but optimal selections should demonstrate a controllable dielectric constant, low loss at the desired operational frequencies, good mechanical strength, toughness and impact resistance. Plastics used should have good environmental resilience in aspects including water absorptivity, UV stability, and thermal dimensional stability. In an exemplary embodiment, ASA plastic with a nominal dielectric constant of 3.5 may be used.

Exemplary index gradient sphere 100 may have a diameter of, for example, 200 mm, although the index gradient sphere 100 is scalable and may have different dimensions. Exemplary index gradient sphere 100 may be formed of 32 wedge sections 105, although a different number of wedge sections 105 is possible and within the scope of the disclosure.

Figure 2:
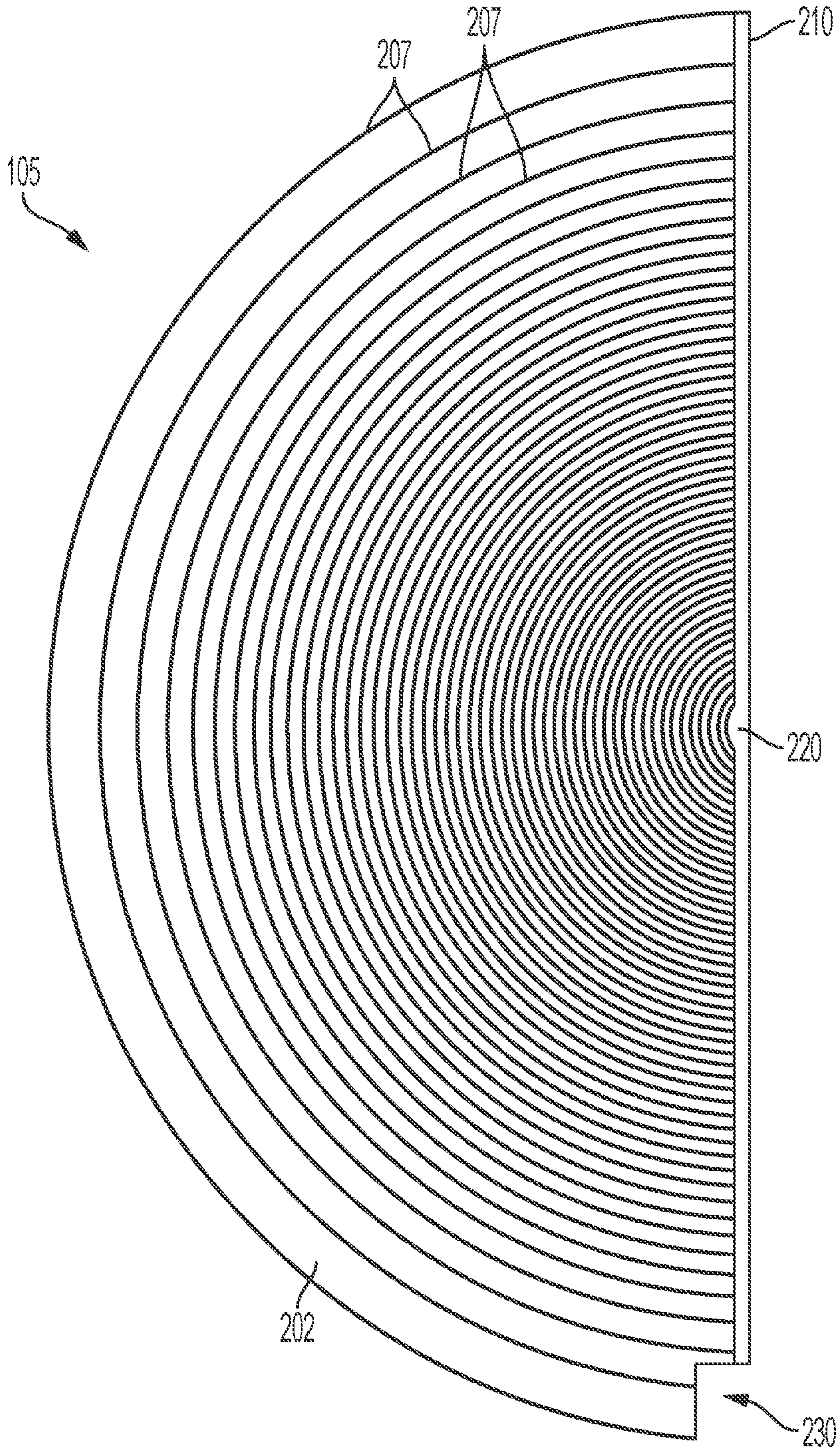
FIG. 2 illustrates an exemplary wedge section of the refractive index gradient lens of FIG. 1.

FIG. 2 illustrates a side view of an exemplary wedge section 105. Wedge section 105 may be formed of a plate 202 on which are disposed a plurality of refractive index gradient-forming features, which in this embodiment comprise concentric rings or arcs 207. In an exemplary embodiment, wedge section 105 has a set of 50 concentric rings or arcs 207. Each of the concentric rings or arcs 207 has a maximum height that corresponds to its radius such that once assembled, each concentric ring or arc 207 may abut the corresponding concentric rings of the neighboring hemispheric wedge sections 105. Wedge section 105 has a polar edge 210 and a polar edge center 220. Given that the maximum height of each concentric ring or arc 207 is a function of its radius, it will be understood that the concentric ring or arc 207 closest to polar edge center 215 will have the shortest maximum height. Each concentric ring or arc 207 may have a thickness of 0.045" and may be spaced from each other by a distance that increases with radius such that, for example, the spacing closest to the polar edge center 220 may be 1⁄32" and the spacing at the outer edge may be 1½", and may generally follow an exponential pattern. Wedge section 105 also has a cutout 230 that accommodates a joining piece (not shown) that may hold the wedge sections 105 together using a bolt and washer, or other appropriate fastener.

Figure 3A:
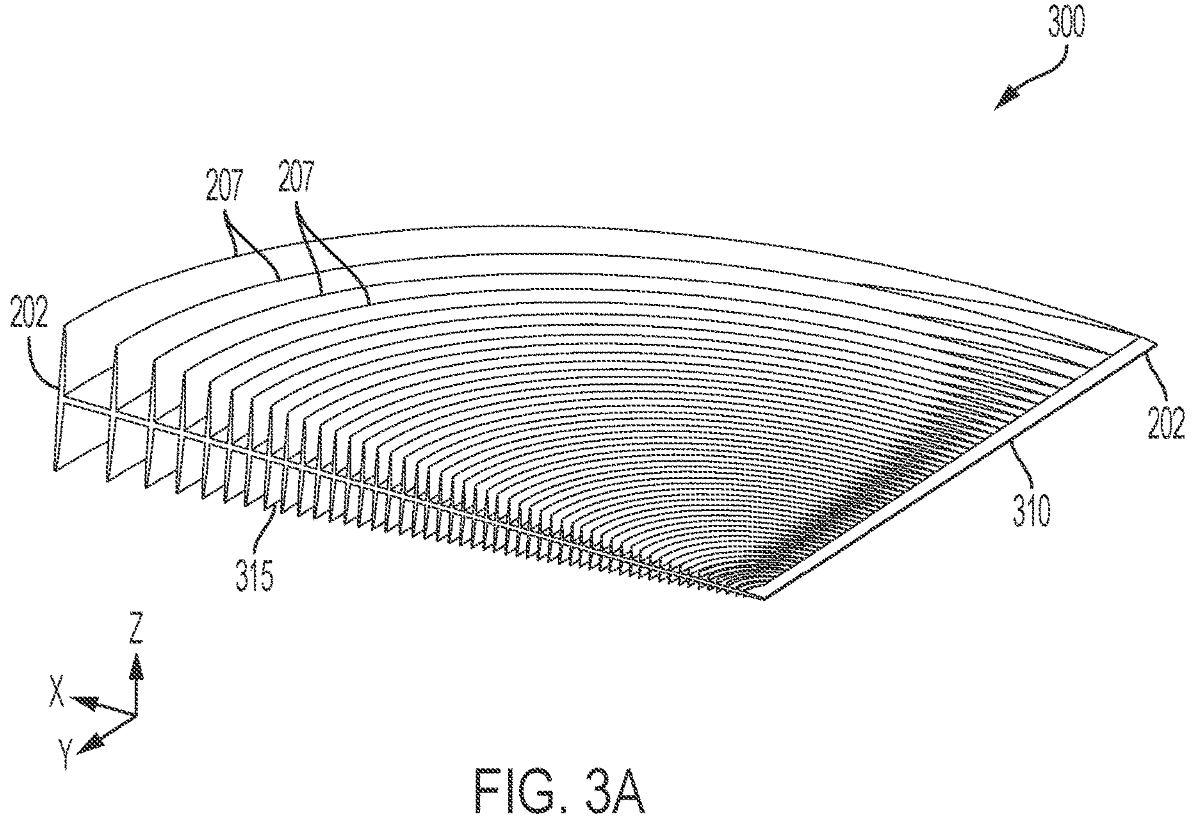
FIG. 3A is a cutaway view of the wedge section of FIG. 2, showing an equatorial cross section.

FIG. 3A is a cutaway view 300 of the wedge section 105, showing an equatorial cross section 315. Illustrated is polar edge 310 and the plurality of concentric rings or arcs 207. As illustrated, each concentric ring or arc 207 tapers as a function of angle of arc from equatorial cross section 315 to polar edge 310. This is because the wedge sections 105 are joined together at their respective polar edges 210 and each concentric ring or arc 207 may abut its counterpart in the neighboring wedge sections 105.

Figure 3B:
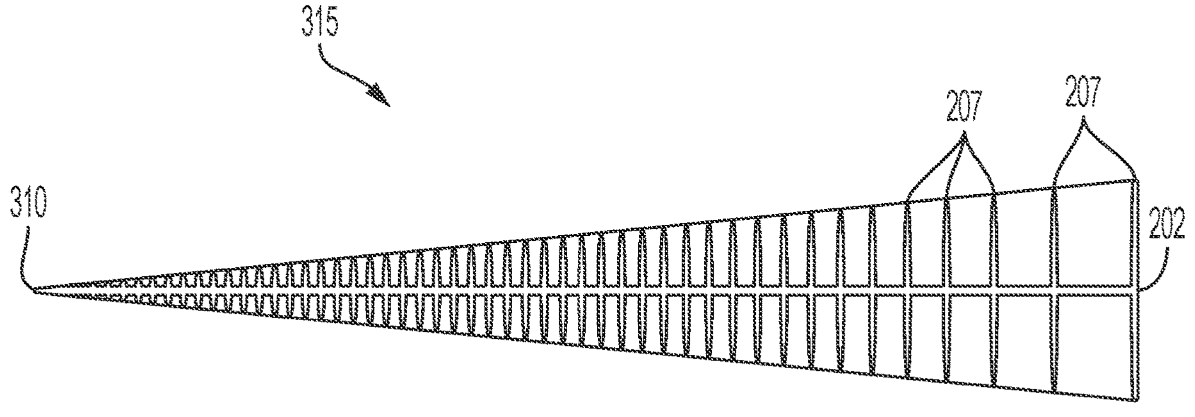
FIG. 3B illustrates an equatorial cross section of the wedge section cutaway of FIG. 3A.

FIG. 3B further illustrates equatorial cross section 315.

Accordingly, when wedge sections 105 are joined together, the volumetric density of material forming the wedge sections 105 decreases as a function of radial distance from the center of Luneberg lens 100 such that at any given radius from the sphere center, a volumetric shell defined by that radius will have a constant refractive index, and each concentric volumetric shell progressing radially outward will have a lower refractive index relative to its inner neighboring volumetric shell.

Figure 4A:
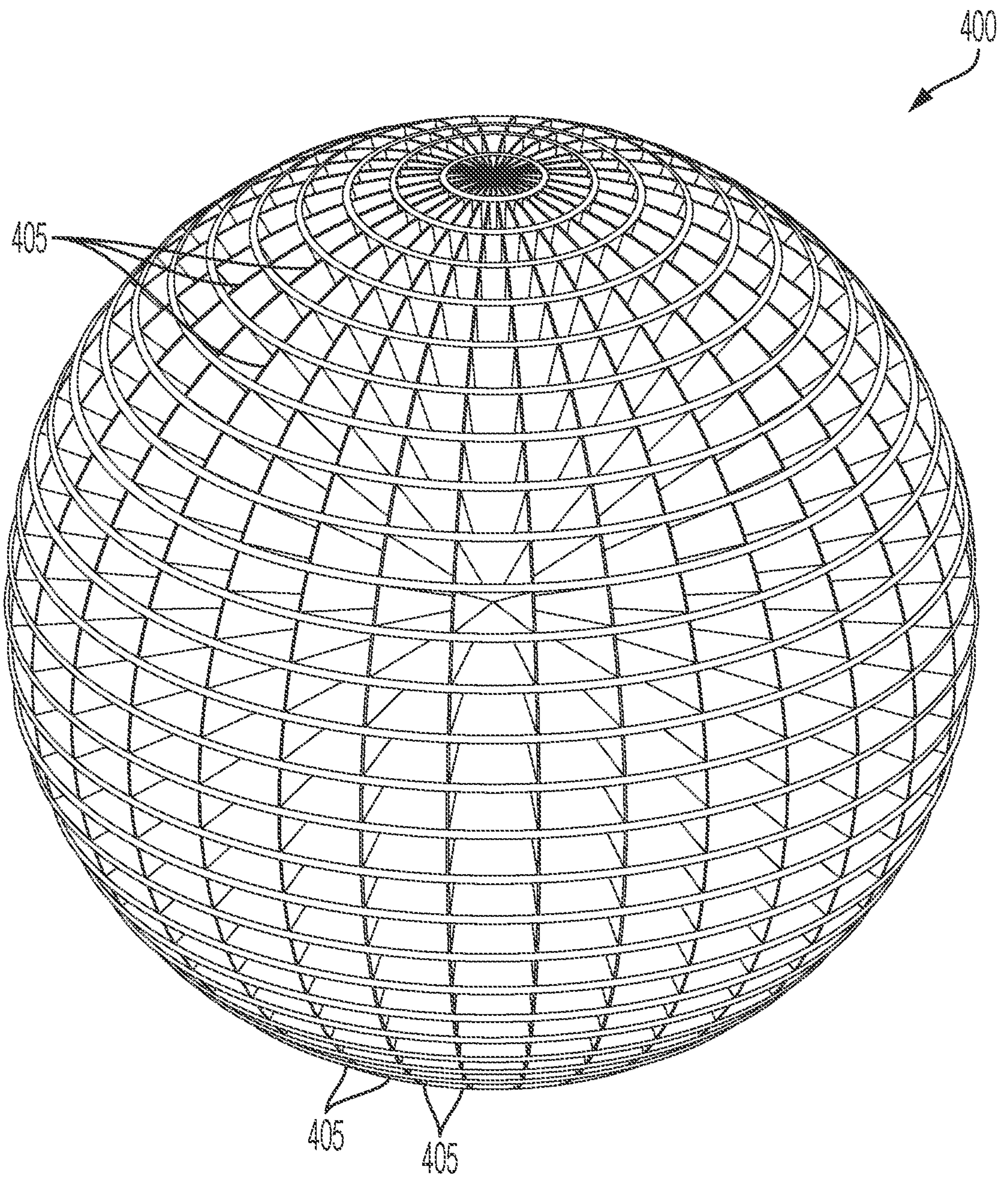
FIG. 4A illustrates a second exemplary assembled refractive index gradient lens according to the disclosure.

FIG. 4A illustrates a second exemplary assembled Luneburg lens 400 according to the disclosure. Luneberg lens 400 is composed of a plurality of wedge sections 405, which may be assembled in a manner similar to wedge sections 105 of Luneberg lens 100.

Figure 4B:
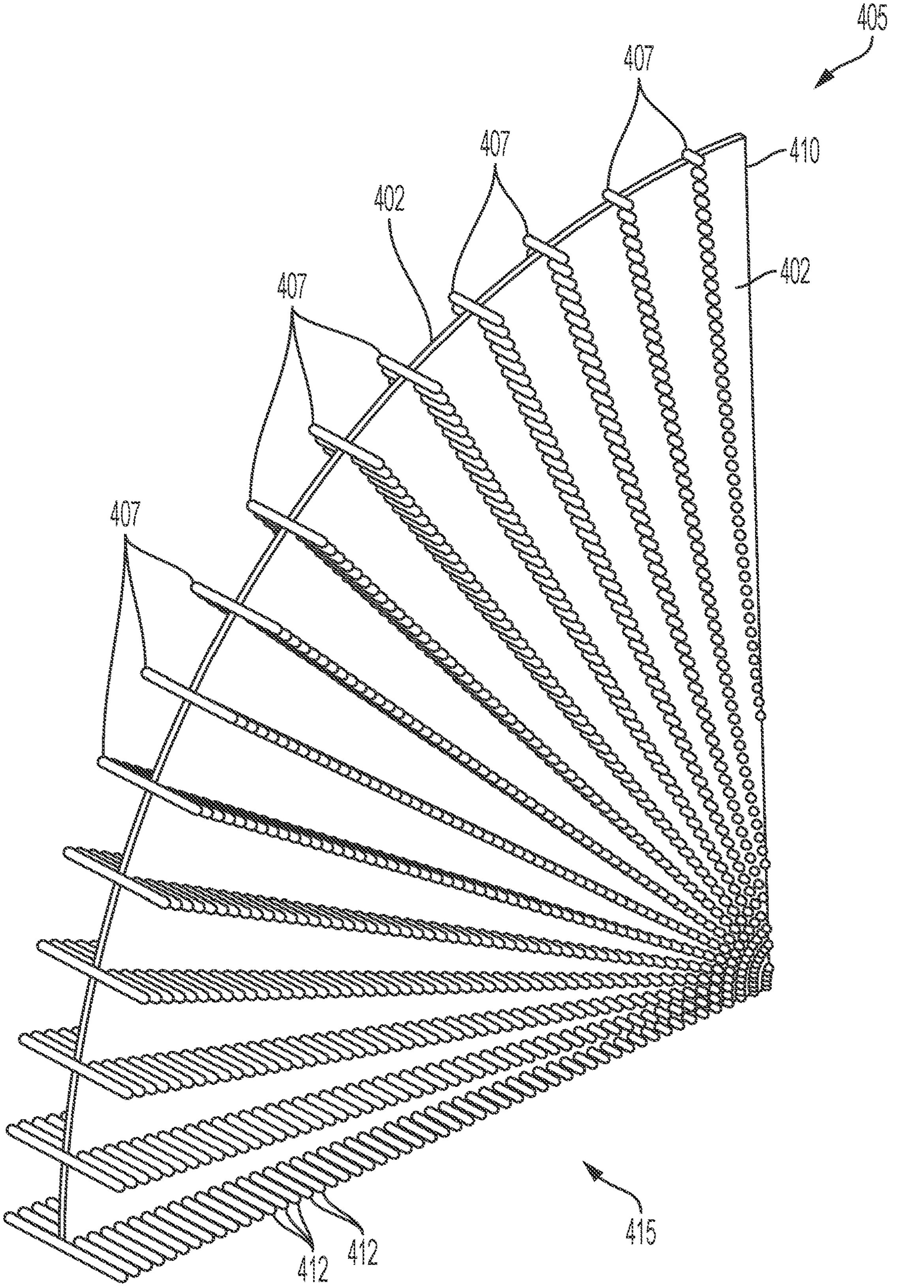
FIG. 4B is a cutaway view of the wedge section of the refractive index gradient lens of FIG. 4A, showing an equatorial cross section.

FIG. 4B is a cutaway view of wedge section 405, showing an equatorial cross section 415 in a manner similar to FIG. 3A. Instead of having concentric rings as its refractive index gradient-forming features, wedge section 405 may have a plate 402 on which are formed a plurality of radial ridges 407. The radial ridge 407 closest to (and most parallel to) polar edge 410 will have the shortest maximum height at the outer edge of wedge section 405, and the radial ridge 407 closest to (and most parallel to) an equatorial plane of Luneberg lens 400 will have the highest maximum height at the outer edge of wedge section 405. The radial ridges 407 of exemplary Luneberg lens 400 may be composed of a plurality of rods 412 that define each radial ridge 407.

Figure 4C:
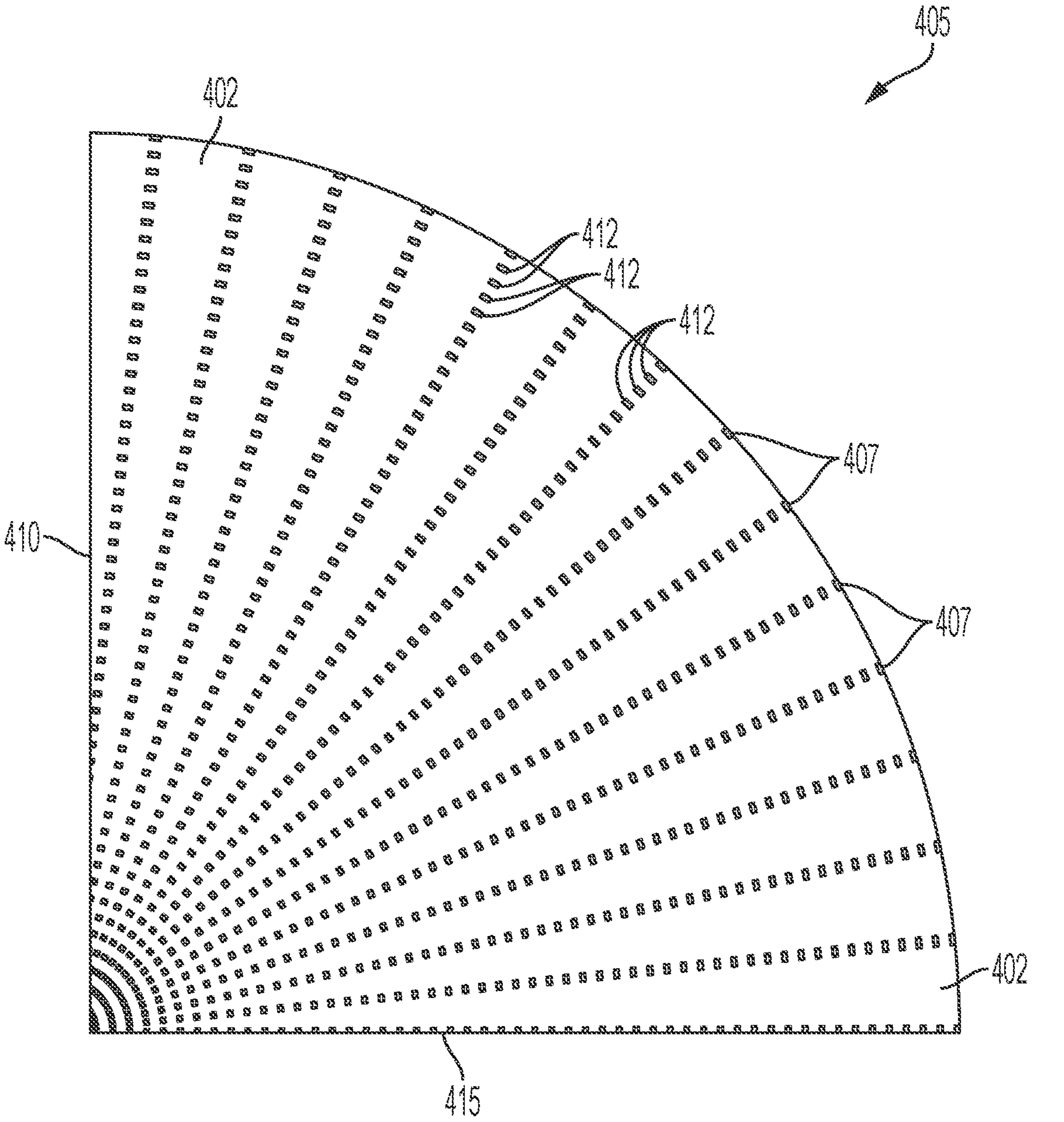
FIG. 4C is another view of a portion of the wedge section of FIG. 4B.

FIG. 4C is another view of a portion of wedge section 405. Illustrated are a plurality of radial ridges 407, each formed of a row of rods 412.

Variations to the above refractive index gradient lenses are possible and within the scope of the disclosure. For example, the diameter of the sphere (and thus its wedge sections) can be scaled to accommodate different frequency bands. Further, more or fewer wedge sections can be used, depending on the size of the intended refractive index gradient lens, the materials used, and the facilities and techniques employed to join the wedge sections to assemble the refractive index gradient lens.

Wedge sections 105/405 may be semicircular, as illustrated in FIG. 2, in which case the drawings in FIGS. 3A, 4B, and 4C would be considered cutaway drawings to illustrate the equatorial cross section 315/415. Alternatively, wedge sections 105/405 may be hemispherical sections, in which case the drawings in FIGS. 3A, 4B, and 4C illustrate the full object, and the hemispherical cross section 315/415 is an actual edge of the object. It will be understood that such variations are possible and within the scope of the invention.

In a further variation, the refractive index gradient lenses of the disclosure may be aspheric in shape. For example, they may have a teardrop shape, a football shape, or some combination of the two. This may alter the shape of the beams emitted by radiators coupled to the refractive index gradient lens, but it could be tailored to create a beam of a desired shape. Further, although the embodiments disclosed above involve a spherically symmetric index gradient, variations to this are possible. For example, by selectively designing the thickness, shape, spacing, and positions of the rings 207 or ridges 407, different (e.g., non-spherically symmetric) volumetric distribution gradients are possible within a refractive index gradient lense according to the disclosure. Additionally, an exemplary refractive index gradient lens may have a combination of an aspheric shape as well as non-spherically symmetric index gradient. It will be understood that such variations are possible and within the scope of the disclosure.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments, but should be defined only in accordance with the following claims and their equivalents.

What is claimed is:

1. A refractive index gradient lens, comprising a plurality of longitudinal wedge sections joined together to form a spherical shaped lens, wherein each longitudinal wedge section provides a longitudinal slice of the refractive index gradient lens, and wherein each longitudinal wedge section comprises:

a plate having a polar edge and an arc edge; and a plurality of arcuate refractive index gradient forming features extending from each face of the plate, the refractive index gradient forming features each having a respective height as function of distance from a polar edge center of the spherical shaped lens whereby the refractive index gradient forming features have a lesser height closer to the polar edge center.

2. The refractive index gradient lens of claim 1, wherein the plurality of refractive index gradient forming features comprises a plurality of concentric arcs, wherein each of the concentric arcs has a center disposed at the polar edge center.

3. The refractive index gradient lens of claim 2, wherein each of the concentric arcs has a maximum height that corresponds to an equatorial cross section of the refractive index gradient lens.

4. The refractive index gradient lens of claim 3, wherein the plurality of concentric arcs comprises a spacing between adjacent concentric arcs that increases as a function of radius.

5. The refractive index gradient lens of claim 4, wherein the plurality of concentric arcs comprises 50 concentric arcs.

6. The refractive index gradient lens of claim 1, wherein the plate and the plurality of refractive index gradient forming features are formed of one piece of material.

7. The refractive index gradient lens of claim 6, wherein the one piece of material comprises an injection-molded plastic.

8. The refractive index gradient lens of claim 1, wherein the plurality of longitudinal wedge sections comprises 32 wedge sections.

9. The refractive index gradient lens of claim 1, wherein each longitudinal wedge section further comprises a cutout that accommodates a joining piece.

10. The refractive index gradient lens of claim 1, wherein the plurality of refractive index gradient forming features comprises a plurality of radial ridges, wherein each of the plurality of radial ridges has a maximum height, the maximum height corresponding to an outer edge of the radial ridge and corresponding a longitudinal angle of the radial ridge relative to an equatorial plane of the refractive index gradient lens.

11. The refractive index gradient lens of claim 10, wherein each of the plurality of radial ridges comprises a plurality of rods.

12. The refractive index gradient lens of claim 1, wherein the refractive index gradient forming features define a spherically symmetric refractive index gradient centered at the polar edge center.

13. The refractive index gradient lens of claim 1, wherein the refractive index gradient forming features define a non-spherically symmetric refractive index gradient centered at the polar edge center.

14. The refractive index gradient lens of claim 1, wherein the height of the refractive index gradient forming features increases smoothly from the polar edge center to the arc edge.

15. The refractive index gradient lens of claim 1, wherein, for each longitudinal wedge section, the plate and the refractive index gradient forming features are formed of injection-molded plastic.

* * * * *